US007372022B2

(12) United States Patent
Roushall et al.

(10) Patent No.: US 7,372,022 B2
(45) Date of Patent: May 13, 2008

(54) MULTIPATH DATA ACQUISITION SYSTEM AND METHOD

(75) Inventors: Randy K. Roushall, Redwood City, CA (US); Robert K. Crawford, Palo Alto, CA (US); August Hidalgo, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 5 days.

(21) Appl. No.: 11/590,028

(22) Filed: Oct. 30, 2006

(65) Prior Publication Data

US 2007/0114379 A1 May 24, 2007

Related U.S. Application Data

(63) Continuation-in-part of application No. 11/070,726, filed on Mar. 1, 2005, now Pat. No. 7,129,480, which is a continuation of application No. 09/625,916, filed on Jul. 26, 2000, now Pat. No. 6,878,931.

(51) Int. Cl.
*B01D 59/44* (2006.01)
*H01J 49/00* (2006.01)

(52) U.S. Cl. ...................... 250/287; 250/281; 250/282; 250/283; 250/286; 250/288

(58) Field of Classification Search ................. 250/287
See application file for complete search history.

(56) References Cited

U.S. PATENT DOCUMENTS 3,581,191 A 5/1971 Anderson
3,602,701 A 8/1971 Boyd
3,674,998 A 7/1972 Benz
3,937,955 A 2/1976 Comisarow et al.
4,794,923 A 1/1989 Bartos
5,027,072 A 6/1991 Rinaldi
5,150,313 A 9/1992 Van Dan Engh et al.
5,328,849 A * 7/1994 Smith .......................... 436/32
5,367,162 A 11/1994 Holland et al.
5,396,065 A 3/1995 Myerholtz et al.
5,416,024 A * 5/1995 Smith .......................... 436/32
5,712,480 A 1/1998 Mason
5,777,326 A 7/1998 Rockwood et al.
5,828,334 A * 10/1998 Deegan ....................... 342/90
5,981,946 A 11/1999 Mason
6,647,347 B1 11/2003 Roushall et al.

FOREIGN PATENT DOCUMENTS

WO WO 99/67801 12/1999

OTHER PUBLICATIONS

Ronald C. Beavis, "Increasing the Dynamic Range of A Transient Recorder by Using Two Analog-to-Digital Converters," (1996) Journal of the American Society for Mass Spectrometry, Elsevier Science, Inc. US 7:(1):107-113.
The European Search Report dated Mar. 28, 2003.

* cited by examiner

*Primary Examiner*—Frank G. Font
*Assistant Examiner*—Mary El-Shammaa

(57) ABSTRACT

Improved data acquisition systems and methods that enable large numbers of data samples to be accumulated rapidly with low noise are described. In one aspect, a data acquisition system includes an accumulator that has two or more parallel accumulation paths and is configured to accumulate corresponding data samples across a transient sequence through different accumulation paths.

21 Claims, 5 Drawing Sheets

MULTIPATH DATA ACQUISITION SYSTEM AND METHOD

CROSS-REFERENCE TO RELATED APPLICATIONS

This application is a continuation-in-part of U.S. patent application Ser. No. 11/070,726, filed Mar. 1, 2005 now U.S. Pat. No. 7,129,480, which application is a continuation of U.S. patent application Ser. No. 09/625,916, filed Jul. 26, 2000 now U.S. Pat. No. 6,878,931, which applications are incorporated herein by reference in their entireties.

TECHNICAL FIELD

This invention relates to data acquisition systems and methods.

BACKGROUND

Data acquisition systems and methods may be used in a variety of applications. For example, data acquisition techniques may be used in nuclear magnetic resonance imaging systems and Fourier transform spectrometer systems. Such techniques also may be used in mass spectrometer systems, which may be configured to determine the concentrations of various molecules in a sample. A mass spectrometer operates by ionizing electrically neutral molecules in the sample and directing the ionized molecules toward an ion detector. In response to applied electric and magnetic fields, the ionized molecules become spatially separated along the flight path to the ion detector in accordance with their mass-to-charge ratios.

Mass spectrometers may employ a variety of techniques to distinguish ions based on their mass-to-charge ratios. For example, magnetic sector mass spectrometers separate ions of equal energy based on their momentum changes in a magnetic field. Quadrupole mass spectrometers separate ions based on their paths in a high frequency electromagnetic field. Ion cyclotrons and ion trap mass spectrometers distinguish ions based on the frequencies of their resonant motions or stabilities of their paths in alternating voltage fields. Time-of-flight (or "TOF") mass spectrometers discriminate ions based on the velocities of ions of equal energy as they travel over a fixed distance to a detector.

In a time-of-flight mass spectrometer, neutral molecules of a sample are ionized, and a packet (or bundle) of ions is synchronously extracted with a short voltage pulse. The ions within the ion source extraction are accelerated to a constant energy and then are directed along a field-free region of the spectrometer. As the ions drift down the field-free region, they separate from one another based on their respective velocities. In response to each ion packet received, the detector produces a data signal (or transient) from which the quantities and mass-to-charge ratios of ions contained in the ion packet may be determined. In particular, the times of flight between extraction and detection may be used to determine the mass-to-charge ratios of the detected ions, and the magnitudes of the peaks in each transient may be used to determine the number of ions of each mass-to-charge in the transient.

A data acquisition system (e.g., an integrating transient recorder) may be used to capture information about each ion source extraction. In one such system, successive transients are sampled and the samples are summed to produce a summation, which may be transformed directly into an ion intensity versus mass-to-charge ratio plot, which is commonly referred to as a spectrum. Typically, ion packets travel through a time-of-flight spectrometer in a short time (e.g., 100 microseconds) and ten thousand or more spectra may be summed to achieve a spectrum with a desired signal-to-noise ratio and a desired dynamic range. Consequently, desirable time-of-flight mass spectrometer systems include data acquisition systems that operate at a high processing frequency and have a high dynamic range.

In one data acquisition method, which has been used in high-speed digital-to-analog converters, data is accumulated in two or more parallel processing channels (or paths) to achieve a high processing frequency (e.g., greater than 100 MHz). In accordance with this method, successive samples of a waveform (or transient) are directed sequentially to each of a set of two or more processing channels. The operating frequency of the components of each processing channel may be reduced from the sampling frequency by a factor of N, where N is the number of processing channels. The processing results may be stored or combined into a sequential data stream at the original sampling rate.

SUMMARY

When applied to applications in which sample sets (or transients) are accumulated to build up a composite signal (e.g., TOF mass spectrometer applications), the process of accumulating samples in parallel processing channels may introduce noise artifacts that are not reduced by summing the samples from each processing channel. In particular, although contributions from random noise and shot noise may be reduced by increasing the number of transients summed, each processing channel may contribute to the composite signal a non-random pattern noise that increases with the number of transients summed. Such pattern noise may result from minute differences in digital noise signatures induced in the system by the different parallel processing paths. For example, the physical separations between the components (e.g., discrete memory, adders and control logic) of a multi-path or parallel-channel data acquisition system may generate voltage and current transitions within the board or chip on which the data acquisition system is implemented. The unique arrangement of each processing path may induce a unique digital noise signature (or pattern noise) in the analog portion of the system. The resulting digital noise signature increases as the composite signal is accumulated, limiting the ability to resolve low-level transient signals in the composite signal.

The invention features improved data acquisition systems and methods that substantially reduce accumulated pattern noise to enable large numbers of data samples to be accumulated rapidly with low noise and high resolution.

In one aspect of the invention, a data acquisition system includes an accumulator that has two or more parallel accumulation paths and accumulates corresponding data samples across a transient sequence through different accumulation paths.

As used herein, the phrase "corresponding data samples across a transient sequence" refers to the summation of data samples from different transients having similar mass-to-charge ratios.

Embodiments may include one or more of the following features.

A controller preferably is coupled to the accumulator and preferably is configured to cycle the accumulation of data samples through each of the accumulation paths. The controller preferably is configured to selectively enable each accumulation path.

Each accumulation path may include an adder and a memory. The accumulation path memory may comprise a dual port random access memory. Each accumulation path preferably is configured to produce an output representative of the sum of two inputs. The accumulation paths may be coupled in series with a first input of each accumulation path coupled to the sampler and a second input of each accumulation path coupled to the output of another accumulation path.

The data acquisition system may include an ion detector.

In another aspect, the invention features a time-of-flight mass spectrometer that includes an ion detector, a sampler, and an accumulator. The ion detector is configured to produce a transient sequence from a plurality of ion packets. The sampler is configured to produce a plurality of data samples from the transient sequence. The accumulator comprises two or more accumulation paths and accumulates corresponding data samples across the transient sequence through different accumulation paths.

In another aspect, the invention features a method of acquiring data. In accordance with this inventive method, a plurality of data samples is produced from a transient sequence, and corresponding data samples are accumulated across the transient sequence through two or more parallel accumulation paths.

Embodiments may include one or more of the following features.

The accumulation of data samples preferably is cycled through each of the parallel accumulation paths. The data samples may be cycled by selectively enabling each accumulation path. Alternatively, the data samples may be cycled by selectively directing consecutive data sample sets to a respective accumulation path. An analog transient may be converted into one or more digital data samples. A transient may be produced from a received ion packet. A plurality of packets may be launched along a flight path defined in a time-of-flight mass spectrometer.

Among the advantages of the invention are the following.

By accumulating corresponding data samples across a transient sequence through different accumulation paths, the overall noise level induced in the spectrum data may be reduced. This feature improves the signal-to-noise ratio in the resulting spectrum and, ultimately, improves the sensitivity of the data acquisition system.

Other features and advantages of the invention will become apparent from the following description, including the drawings and the claims.

DETAILED DESCRIPTION

Figure 1:
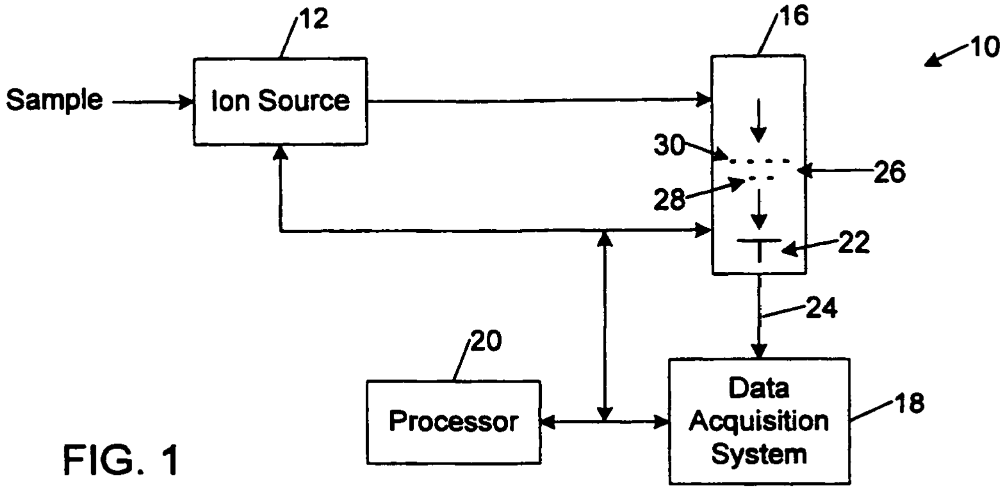
FIG. 1 is a block diagram of a time-of-flight mass spectrometer, including a flight tube and a data acquisition system.

Referring to FIG. 1, a time-of-flight mass spectrometer 10 includes an ion source 12, a flight tube 16, a data acquisition system 18, and a processor 20 (e.g., a computer system). Time-of-flight mass spectrometer 10 may be arranged in an orthogonal configuration or on-axis configuration. Ion source 12 may generate ions using any one of a variety of mechanisms, including electron impact, chemical ionization, atmospheric pressure ionization, glow discharge and plasma processes. Flight tube 16 includes an ion detector 22 (e.g., an electron multiplier), which is configured to produce a sequence of transients 24 containing a series of pulses from which the quantities and mass-to-charge ratios of the ions within each transient may be determined. In operation, sample molecules are introduced into source 12, ion source 12 ionizes the sample molecules, and packets of ionized molecules are launched down flight tube 16. A conventional orthogonal pulsing technique may be used to release the packets of ions into flight tube 16. The ions of each packet drift along a field-free region defined inside flight tube 16. As they drift down flight tube 16, the ions separate spatially in accordance with their respective masses, with the lighter ions acquiring higher velocities than the heavier ions.

In FIG. 1, an ion packet 26 consists of two constituent ion concentrations: a relatively low concentration of lighter ions 28, and a relatively high concentration of heavier ions 30.

Referring to FIGS. 2A-2D, after an initial time delay corresponding to the time between the extraction pulse and the arrival of the first (i.e., the lightest) ions at the detector, detector 22 produces a transient 32 representative of the ion intensities in the detected ion source extraction. The peaks 34, 36 of transient 32 represent the numbers of light ions 28 and heavy ions 30, respectively, and the peak times correspond to the mass-to-charge ratios of the ions within transient 32. Detector 22 produces a sequence of additional transients 38, 40 from subsequent ion packets launched into flight tube 16.

Figure 2A:
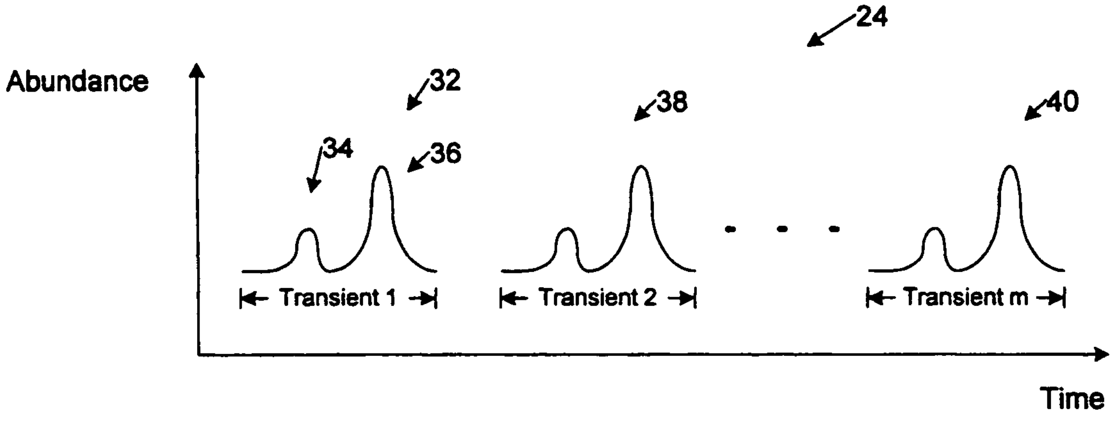
FIG. 2A is a plot of a transient sequence produced by an ion detector in the flight tube of FIG. 1.
Figure 2B:
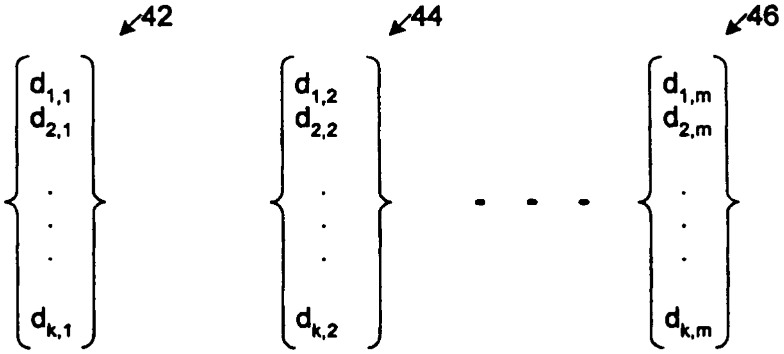
FIG. 2B is a diagrammatic view of a plurality of sets of data samples produced by the data acquisition system from transient sequence of FIG. 2A.
Figure 2C:
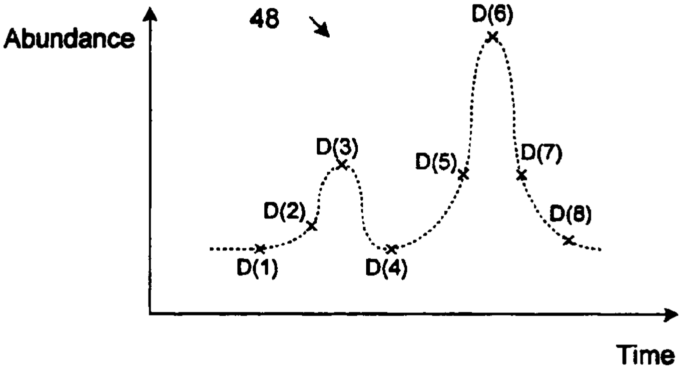
FIG. 2C is a plot of an accumulated sample spectrum produced by the data acquisition system from the data sample sets of FIG. 2B.
Figure 2D:
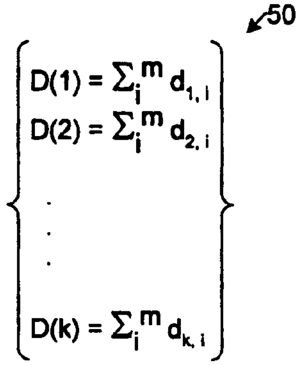
FIG. 2D is a diagrammatic view of an accumulated data sample set corresponding to the accumulated sample spectrum of FIG. 2C.

Data acquisition system 18 samples m transients 32, 38, 40, and produces from each transient data samples ($d_{j,1}$, $d_{j,2}$, . . . , $d_{j,m}$, where j=1 to k) that may be represented as a respective data sample set 42, 44, 46 (FIG. 2B). The resulting data samples ($d_{j,1}$, $d_{j,2}$, . . . , $d_{j,m}$) are accumulated by data acquisition system 18 to produce a spectrum 48 (FIG. 2C), which may be represented by an accumulated data sample set 50 (FIG. 2D), in which each member corresponds to the sum of ion samples ($d_{j,i}$, where i=1 to m) having similar mass-to-charge ratios.

Data acquisition system 18 may be designed to control the operation of time-of-flight mass spectrometer 10, collect and process data signals received from detector 22, control the gain settings of the output of ion detector 22, and provide a set of time array data to processor 20. As explained in detail below, data acquisition system 18 is configured to accumulate corresponding data samples across the transient sequence 24 through each of a plurality of parallel data accumulation paths. In this way, data acquisition system 18 may accumulate data samples at a high speed, while reducing the impact of noise introduced by data acquisition system 18.

Figure 3:
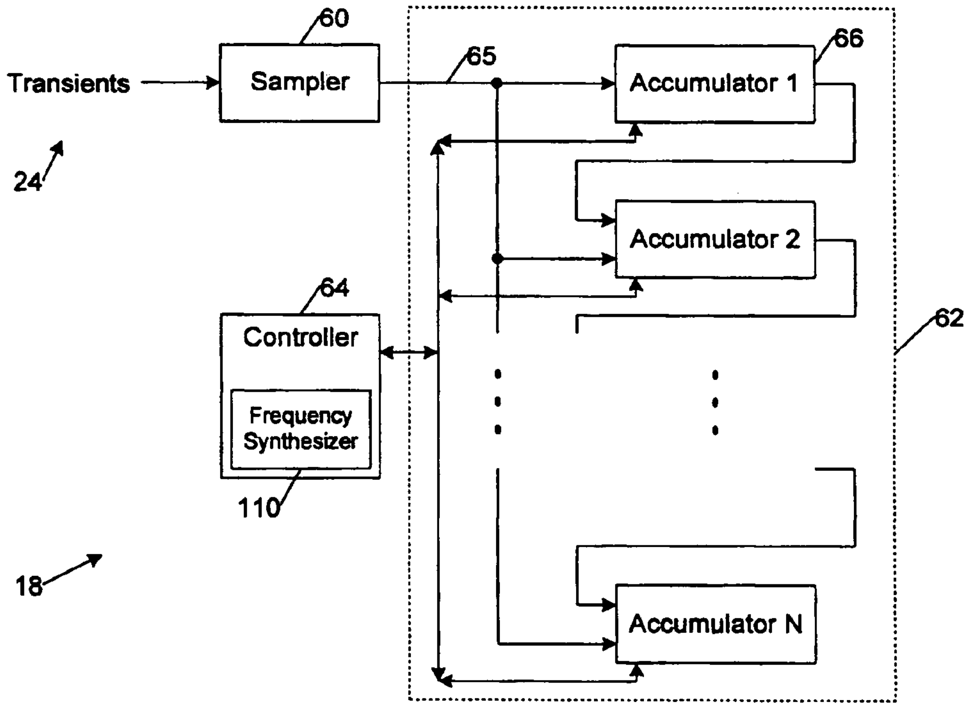
FIG. 3 is a block diagram of the data acquisition system of FIG. 1, including a plurality of accumulation paths each having a respective accumulator.

Referring to FIG. 3, in one embodiment, data acquisition system 18 includes a sampler 60 (e.g., a high speed flash analog-to-digital converter), a multipath sample accumulator 62 and a controller 64. Sampler 60 samples transients 24 and produces a series of data samples 65, which are applied to an input of sample accumulator 62. The output of sampler 60 is a series of digital signals (i.e., an n-bit word) each of which represents instantaneous ion intensities at respective sampling times. The resolution with which sampler 60 captures the instantaneous ion intensities is determined by the bit width of sampler 60. Sample accumulator 62 includes a plurality (N) of accumulators 66 that define a respective plurality of parallel data accumulation paths. In operation, controller 64 directs the data samples to one of the N accumulators 66 in sequence. Thus, each accumulator 66 processes only 1/N of the data samples and need only operate at a frequency that is roughly only 1/N of the operating frequency of a comparable single-path data acquisition system (e.g., the sampling rate). At the same time, controller 64 cycles the accumulation of data samples through each of the accumulation paths so that corresponding data samples across the transient sequence are accumulated through each of the accumulation paths. For example, assuming that eight data samples ($d_{1,i}$, $d_{2,i}$, . . . , $d_{8,i}$) are measured for each transient 24, the data samples would be accumulated after each of m transients as follows:

TABLE 1

Cycled Transient Accumulation

| | After Signal 1 | After Signal 2 | After Signal 3 | . . . | After Signal m |
|---|---|---|---|---|---|
| Accumulator 1 | $d_{1,1}$ | $d_{8,1} + d_{8,2}$ | $d_{7,1} + d_{7,2} + d_{7,3}$ | . . . | $d_{1,1} + \ldots + d_{1,m}$ |
| Accumulator 2 | $d_{2,1}$ | $d_{1,1} + d_{1,2}$ | $d_{8,1} + d_{8,2} + d_{8,3}$ | . . . | $d_{2,1} + \ldots + d_{2,m}$ |
| Accumulator 3 | $d_{3,1}$ | $d_{2,1} + d_{2,2}$ | $d_{1,1} + d_{1,2} + d_{1,3}$ | . . . | $d_{3,1} + \ldots + d_{3,m}$ |
| Accumulator 4 | $d_{4,1}$ | $d_{3,1} + d_{3,2}$ | $d_{2,1} + d_{2,2} + d_{2,3}$ | . . . | $d_{4,1} + \ldots + d_{4,m}$ |
| Accumulator 5 | $d_{5,1}$ | $d_{4,1} + d_{4,2}$ | $d_{3,1} + d_{3,2} + d_{3,3}$ | . . . | $d_{5,1} + \ldots + d_{5,m}$ |
| Accumulator 6 | $d_{6,1}$ | $d_{5,1} + d_{5,2}$ | $d_{4,1} + d_{4,2} + d_{4,3}$ | . . . | $d_{6,1} + \ldots + d_{6,m}$ |
| Accumulator 7 | $d_{7,1}$ | $d_{6,1} + d_{6,2}$ | $d_{5,1} + d_{5,2} + d_{5,3}$ | . . . | $d_{7,1} + \ldots + d_{7,m}$ |
| Accumulator 8 | $d_{8,1}$ | $d_{7,1} + d_{7,2}$ | $d_{6,1} + d_{6,2} + d_{6,3}$ | . . . | $d_{8,1} + \ldots + d_{8,m}$ |

As explained in detail below, each accumulation path induces a unique noise signal in each of the transients 24. By cycling the accumulation of data samples through each of the N accumulation paths, data acquisition system 18 reduces the noise level in the accumulated spectrum 48 relative to a system that does not perform such cycling. In particular, the accumulated spectrum may be expressed as:

$$D(h)=\Sigma^{m}_{j=1}d(h,j) \tag{1}$$

where d(h, j) is the $j^{th}$ accumulated data point having a mass-to-charge ratio of h. The component data samples of the accumulated data points (d(h, j)) may be expressed as follows:

$$d(h,j)=s(h,j)+v(h,j)+n(h,j) \tag{2}$$

where s(h, j) is the noise-free signal, v(h, j) is the signature (or pattern) noise induced by the paths of the data acquisition system, and n(h, j) is random noise. The induced signature noise (v(h, j)) is a non-random, non-white noise source that is specific to each accumulation path. In a dual-path data accumulation embodiment, all of the even-numbered samples have the same induced digital noise (i.e., v(2, j)=v(4, j)), and all of the odd-numbered samples have the same induced digital noise (i.e., v(1, j)=v(3, j)). Similarly, for a four-path data accumulation embodiment, v(1, j)=v(5, j), v(2, j)=v(6, j), v(3, j)=v(7, j), and v(4, j)=v(8, j).

Without path cycling, the induced signature noise is the same across the data samples (i.e., v(h, 1)=v(h, 2)=. . . =v(h, m)). As a result, the accumulated spectrum signal may be estimated by the following equation:

$$D(h)=m\cdot s(h)+m\cdot v(h)+\Sigma^{m}_{j=1}n(h,j) \tag{3}$$

The random noise source (n(h, j)) falls off by the square root of m and, therefore, becomes negligible for large values of m. The induced signature noise (v(h)), however, increases because it is specific to each an accumulation channel and not random. Thus, in a dual-path data accumulation system, $$D(1)=m\cdot s(1)+m\cdot v(1) \tag{4}$$

$$D(2)=m\cdot s(2)+m\cdot v(2) \tag{5}$$

For large transient signals, the s(h) term dominates the v(h) and, consequently, the data acquisition system may resolve the data signal. For small transient signals, however, the v(h) term may be larger than the s(h) term, making it difficult to resolve the data signal. In particular, for small transient signals, the difference between data points in the accumulated spectrum may be estimated as follows:

$$D(2)-D(1)=m\cdot v(2)-m\cdot v(1) \tag{6}$$

Figure 6:
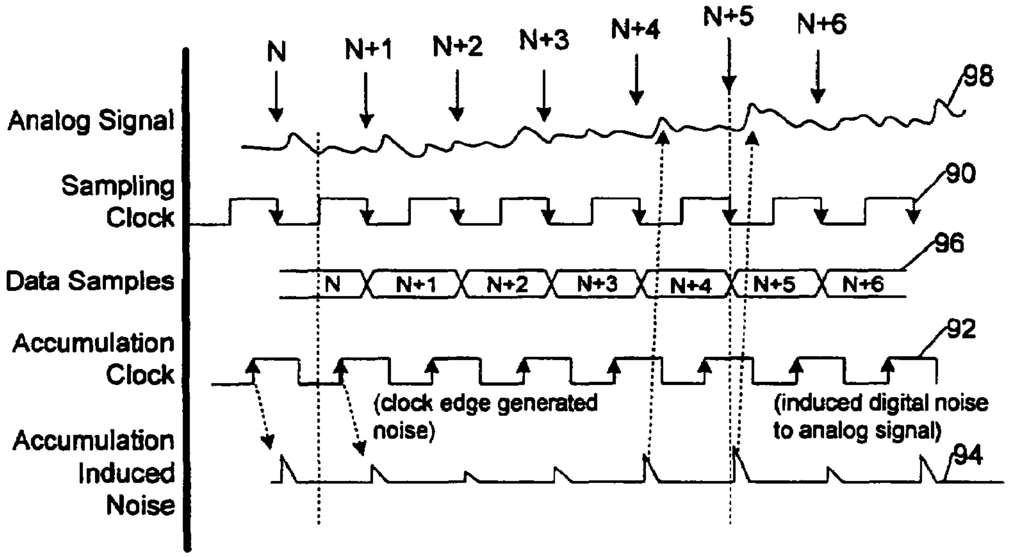
FIG. 6 is a plot of signals of a mass spectrometer having a single-path accumulator that is clocked by an accumulation clock that is shifted in phase relative to a sampling clock.

This difference is the cause of the induced pattern noise signal 94 shown in FIG. 6.

On the other hand, if the sample accumulation is cycled through each of the N accumulation paths as described above, the induced digital noise signatures may be reduced substantially or eliminated as follows. In a dual-path data accumulation embodiment the following relationships are established (ignoring random noise). The data samples for the first transient may be expressed as follows:

$$d(1, 1)=s(1, 1)+v(1, 1) \quad (7)$$

$$d(2, 1)=s(2, 1)+v(2, 1) \quad (8)$$

$$d(3, 1)=s(3, 1)+v(1, 1) \quad (9)$$

$$d(4, 1)=s(4, 1)+v(2, 1) \quad (10)$$

where v(1, 1)=v(3, 1) and v(2, 1)=v(4, 1) in a dual-path data accumulation system. The data samples for the second transient may be expressed as follows:

$$d(1, 2)=s(1, 2)+v(2, 2) \quad (11)$$

$$d(2, 2)=s(2, 2)+v(1, 2) \quad (12)$$

$$d(3, 2)=s(3, 2)+v(2, 2) \quad (13)$$

$$d(4, 2)=s(4, 2)+v(1, 2) \quad (14)$$

Since the induced digital signature noise (v(h, j) is the same for all transients (i.e., v(1, 1) =v(1, 2) and v(2, 1)=v(2, 2)), equations (11)-(14) may be re-written as follows:

$$d(1, 2)=s(1, 2)+v(2, 1) \quad (15)$$

$$d(2, 2)=s(2, 2)+v(1, 1) \quad (16)$$

$$d(3, 2)=s(3, 2)+v(2, 1) \quad (17)$$

$$d(4, 2)=s(4, 2)+v(1, 1) \quad (18)$$

Thus, the summation of the data points for the first two transients may be expressed as follows:

$$D(1)=s(1, 1)+s(1, 2)+[v(1, 1)+v(2, 1)] \quad (19)$$

$$D(2)=s(2, 1)+s(2, 2)+[v(2, 1)+v(1, 1)] \quad (20)$$

$$D(3)=s(3, 1)+s(3, 2)+[v(1, 1)+v(2, 1)] \quad (21)$$

$$D(4)=s(4, 1)+s(4, 2)+[v(2, 1)+v(1, 1)] \quad (22)$$

As a result, the induced digital signature noise terms drop out in the difference between any two adjacent data points. For example, the difference between the first accumulated data point (D(1)) and the second accumulated data point (D(2)) may be expressed as follows:

$$D(2)-D(1)=[s(2, 1)+s(2, 2)]-[s(1, 1)+s(1, 2)] \quad (23)$$

In general, the difference between any two adjacent data points may be expressed as follows:

$$D(h)-D(h-1)=\Sigma_j[s(h, j)+s(h-1, j)]+\Sigma^m_{j=1}[n(h, j)+n(h-1, j)] \quad (24)$$

The only noise term remaining in equation (24) is the random noise source (n(h, j)), which drops off by the square root of the number of summations (m). In this case, equation (3) reduces to the following form:

$$D(h)=m\cdot s(h)+\Sigma^m_{j=1}n(h, j) \quad (25)$$

This feature of the data acquisition system advantageously improves the signal-to-noise ratio of the accumulated spectrum 48 and, ultimately, improves the sensitivity of the measurements of mass spectrometer 10.

Figure 4:
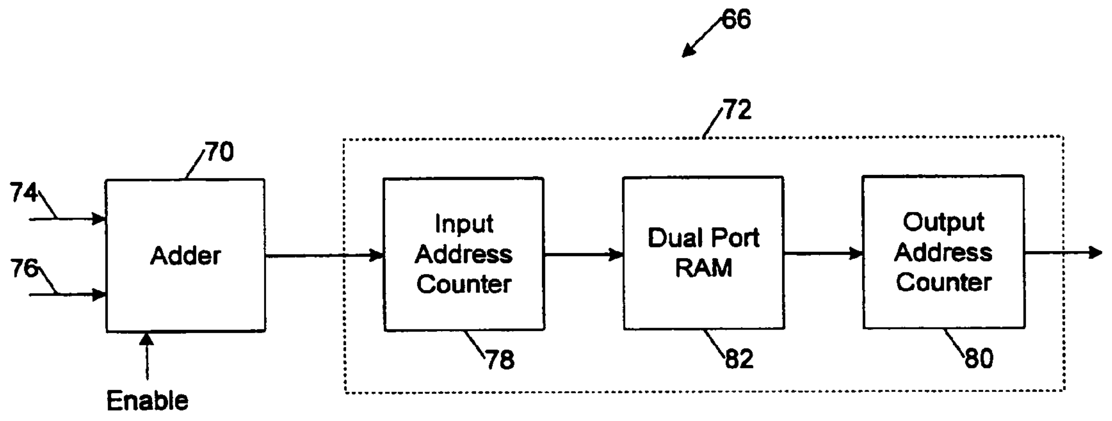
FIG. 4 is a block diagram of an accumulator of the data acquisition system of FIG. 3.

Referring to FIG. 4, in one embodiment, each accumulator 66 includes an adder 70 and a memory system 72. In operation, during each clock cycle adder 70 computes the sum of the signal values applied to inputs 74, 76, and memory system 72 stores the computed sum. As shown in FIG. 4, memory system 72 may include an input address counter 78, an output address counter 80 and a dual port random access memory (RAM) 82. In one embodiment, controller 64 selectively enables adder 70 so that corresponding data samples generated by sampler 60 are accumulated through each of the data accumulation paths. In another embodiment, controller 64 selectively directs data samples to respective accumulation paths, for example, by controlling the output of a 1-by-N multiplexer, which is coupled between sampler 60 and sample accumulator 62.

Other embodiments are within the scope of the claims.

Figure 5:
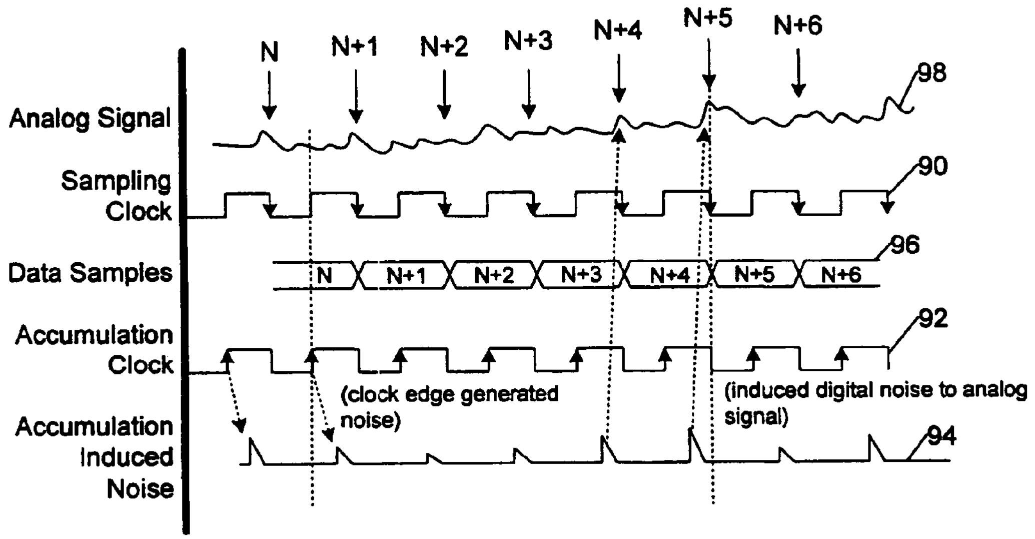
FIG. 5 is a plot of signals of a mass spectrometer having a single-path accumulator that is clocked by an accumulation clock that is synchronized with a sampling clock.

Referring to FIG. 5, in a single accumulation path embodiment, sampler 60 is configured to sample transients 24 received from ion detector 22 in response to the falling edge of a sampling clock 90. Sample accumulator 62, on the other hand, is configured to accumulate data in response to the rising edge of an accumulation clock 92. If sampling clock 90 and accumulation clock 92 are in phase (as shown), the rising edge of accumulation clock 92 may induce a noise signal 94 in an analog transient 98. The induced noise ultimately may appear in data samples 96 produced by sampler 60, reducing the signal-to-noise ratio and reducing the sensitivity of the accumulated spectrum 48. Without being limited to a particular theory, it is believed that this noise is generated, at least in part, by a capacitive coupling between sample accumulator 62 and sampler 60.

The magnitude of the accumulation clock induced noise signal 94 may be reduced substantially by shifting the phase of accumulation clock 92 relative to sampling clock 90. For example, referring to FIG. 6, by shifting accumulation clock 92 relative to sampling clock 90, the noise signal peaks 99, which are induced in transient 98, may be shifted away from the sampling times (i.e., the falling edges of sampling clock 90) to reduce the noise level appearing in accumulated spectrum 48. Accumulation clock 92 preferably is shifted relative to sampling clock 90 by an amount selected to minimize induced noise signal 94. In one embodiment, accumulation clock 92 preferably is shifted between 90° and 270° relative to sampling clock 90, and more preferably is shifted approximately 180° relative to sampling clock 90.

Figure 7:
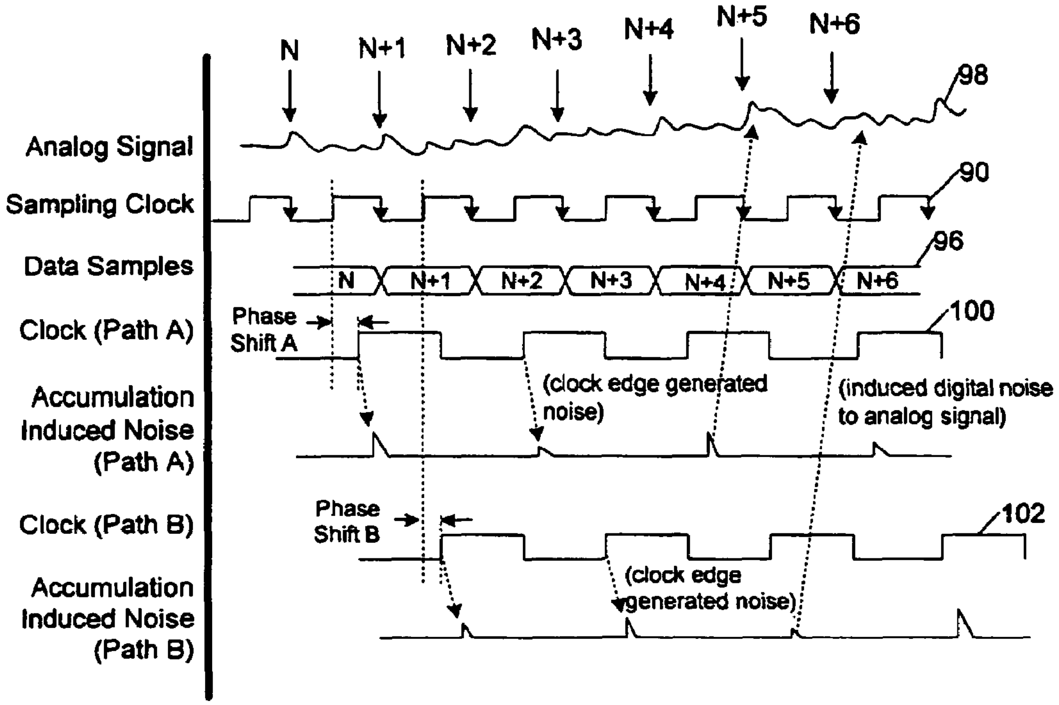
FIG. 7 is a plot of signals of a mass spectrometer having a accumulator with multiple accumulation paths, each of which is clocked by a respective accumulation clock that is shifted in phase relative to a sampling clock by a respective amount.

Referring to FIG. 7, in another embodiment, sample accumulator 62 includes two accumulation paths (Path A and Path B), each of which accumulates data samples in response to a respective accumulation clock 100, 102. In this embodiment, the phase of each accumulation clock 100, 102 is shifted relative to sampling clock 90 by a respective amount selected to reduce the overall noise in the accumulated spectrum 48. The phases of accumulation clocks 100, 102 may be shifted by the same amount relative to sampling clock 90, or they may be shifted independently by different amounts (as shown).

The above-described phase shift between sampling clock 90 and the one or more accumulation clocks may be implemented by a multiphase frequency synthesizer 110 (FIG. 3) that includes a phase-locked loop, a delay-locked loop, or any phase-shifting clock driver. In addition, the phase shift between sampling clock 90 and the one or more accumulation clocks may be programmable to enable the relative clock phases to be adjusted during an initial calibration of mass spectrometer 10 or dynamically during operation of mass spectrometer 10.

It should be noted that techniques other than those described above may be used to compensate for error introduced by the adders. In certain embodiments, a system for producing mass spectra is provided. The system may contain: an ion detector that produces an analog signal; an analog-to-digital converter configured to sample the analog signal to produce corresponding digital samples; a plurality of adders configured to sum the corresponding digital samples to produce a summed sample indicating a mass spectrum, wherein the adders introduce errors; and a controller configured to compensate for the errors introduced by the adders. The controller may be configured to compensate for the errors of the adders using the multipath or the phase-shifting methods described above, or the controller may compensate for the errors by combining the summed sample with a value indicative of an expected error introduced by the adders. As will be explained in greater detail below, an expected error may based on an actual error determined for one or more calibration signals tested by the system. In certain embodiments, the error may be from pattern noise, although the source of error may vary.

Such calibration-based methods may be employed in any system for producing mass spectra. The system may employ a single adder or a plurality of adders. If the subject calibration-based methods employed in a system that contains a plurality of adders, the corresponding samples of a series of transients may each be accumulated by a single adder (e.g., using traditional parallel processing methods), or each may be accumulated by a plurality of different adders (e.g., using the multipath methods discussed above). In other words, the resultant summed sample indicating a mass spectrum may be summed using a single adder, or using a plurality of different adders, as discussed above.

For example, in one embodiment, the controller 64 may be configured to analyze the data in memory to estimate an amount of error introduced by each adder or a plurality of adders. Then, the controller 64 may mathematically combine (e.g., add, subtract, multiply, or divide) the estimated error from·summed samples stored in memory in an effort to eliminate or reduce error from these summed samples.

For example, in one embodiment, the controller 64 may be configured to operate in the same way as a conventional controller, or a controller configured to operated as described above, to generate a plurality of summed samples stored in memory. Each summed sample represents a running sum that defines a point of the resulting mass spectrum. Each such running sum may be based on the samples accumulated using only one of the adders (if only one adder is employed), or many adders if the subject multipath methods are employed.

Figure 8:
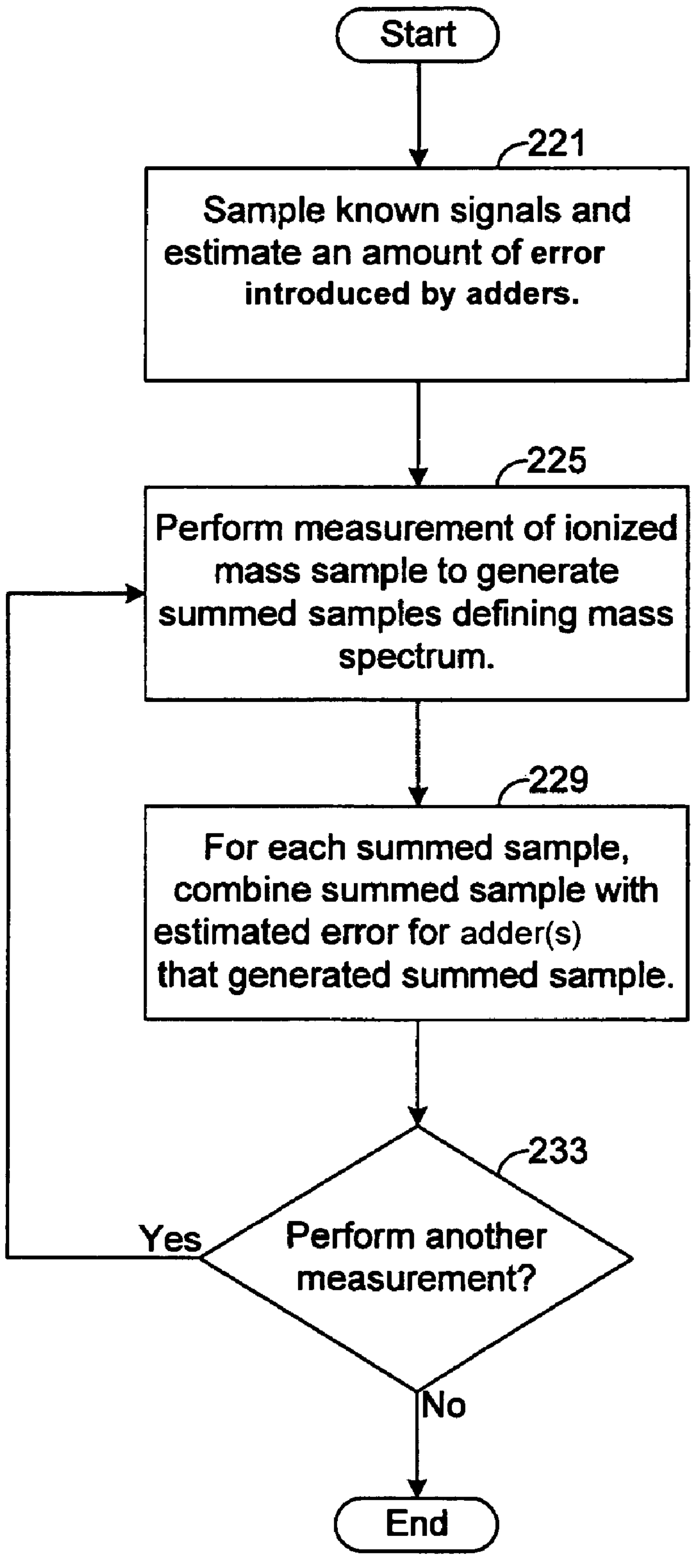
FIG. 8 is a flow chart illustrating an exemplary methodology for compensating sampling errors generated by adders of a mass spectrometer.

However, before beginning a measurement of an ionized mass sample, a calibration process is performed by the spectrometer to enable the controller 64 to estimate an amount of error introduced by each adder used for sample accumulation, as depicted by block 221 of FIG. 8.

During the calibration process, the adders may be employed to accumulate known signals, so that, for each such signal, ideal values of the summed samples are known by the controller 64. An ideal sample value refers to a sample value that is free of the errors introduced by the adders.

As an example, in one embodiment, a calibration signal (a defined value that is digitized, e.g., a digital signal that is similar to an output of sampler 60) may be applied to the input of an adder by a signal generator (not shown). In another embodiment, the calibration signal may be produced by a sampler 60 having an input of a known DC voltage. Thus, the value of each sample generated by the adders should ideally correspond to the defined value of the calibration signal. For example, if a calibration signal is applied to the input ports of the adders of a subject system, then each summed sample in memory would ideally- equal the calibration value times the number of sums performed by the adder to produce the summed sample. Thus, the controller 64 can analyze the samples stored in memory after the calibration signal has been sampled to estimate an amount of error introduced by each adder.

For instance, in the example described above, a particular address may store the running sum of samples generated by an adder. Thus, the controller 64 can compare the expected or ideal value for this address to the actual value stored in this address after sampling of the calibration signal to estimate the error introduced by the adder. The controller 64 may similarly compare the running sums based on the samples of other adders to estimate the error introduced by these adders. Further, multiple different calibration signals may be similarly tested to determine the error introduced by the adders for other signals.

Based on the errors determined by the controller 64 for the one or more calibration signals, the controller 64 can estimate, for each of the adders, a value, referred to as the "estimated error value," indicative of the estimated error introduced by the respective adder and a value. These value can be used to adjust the mass spectrum samples generated by the spectrometer, as will be described in more detail below.

Once the calibration process is complete and the controller 64 has determined estimated error value for each adder, a measurement of a mass sample is performed, as depicted by block 225 of FIG. 8. Thus, the controller 64 may control the other components of the spectrometer, such that summed samples defining the mass spectrum of the ionized mass sample are stored in memory. For each such summed sample, the controller 64 uses the estimated error value for the adder or adders that generated the summed sample in order to compensate for error introduced by that adder or adders, as depicted by block 229. The error may be compensated immediately after each sum (e.g., immediately after two corresponding samples in a series of transients have been summed together in an adder), or after all of the corresponding samples for a series of transients have been summed (e.g., by correcting the summed sample by the combined error for all of the adders used to accumulate that summed sample).

In particular embodiments, the controller 64 may mathematically combine (e.g., add, subtract, multiply, or divide) the summed sample at a particular address with the estimated error value determined for the adder or adders used to accumulate that summed sample. The controller 64 may similarly adjust the other summed samples stored in memory for the current measurement to similarly compensate for the error introduced by the adder or adders on which these samples are based.

After adjusting the samples in block 229, the samples stored in the memory define a more accurate mass spectrum for the mass sample ionized in block 225. As indicated by block 233, blocks 225 and 229 can be repeated if additional measurements of the same mass sample or different mass samples are to be performed.

In the aforedescribed embodiment, the controller 64 performs both the mass spectra measurements and the summed sample adjustments that are based on error estimates. However, it is possible for the functionality described above for controller 64 to be performed by multiple components. For example, a microprocessor (not shown) may be used to implement at least a portion of the functionality described above for the controller 64, and the memory may be communicatively coupled to a host computer system (not shown) configured to receive and process the data stored in memory.

The host computer system, separate from the microprocessor, may be configured to estimate the error introduced by the adders based on the values stored in memory during the calibration process. Thereafter, the host computer system may adjust the summed samples defining a mass spectrum for an ionized mass sample based on the estimated error. In such an embodiment, the microprocessor and the host computer system separately implement portions of the functionality described above for the controller 64. Various other configurations of the controller 64 are possible in other embodiments.

The systems and methods described herein are not limited to any particular hardware or software configuration, but rather they may be implemented in any computing or processing environment. Data acquisition controller 64 preferably is implemented in hardware or firmware. Alternatively, controller 64 may be implemented in a high level procedural or object oriented programming language, or in assembly or machine language; in any case, the programming language may be a compiled or interpreted language.

Still other embodiments are within the scope of the claims.

What is claimed is:

1. A system for producing mass spectra, comprising:

an ion detector that produces an analog signal;

an analog-to-digital converter configured to sample said analog signal to produce corresponding digital samples;

a plurality of adders configured to sum said corresponding digital samples to produce a summed sample indicating a mass spectrum, wherein said adders introduce errors; and a controller configured to compensate for the errors introduced by the adders.

2. The system of claim 1, wherein said controller is configured to combine said summed sample with a value indicative of an expected error introduced by said adders.

3. The system of claim 2, wherein said expected error is based on an actual error determined for a calibration signal tested by the system.

4. The system of claim 2, wherein said expected error is based on actual errors determined for a plurality of different calibration signals tested by the system.

5. The system of claim 1, wherein said controller is configured to ensure that said summed sample is produced using at least two different adders.

6. The system of claim 5, wherein said corresponding digital samples are summed using different accumulation paths.

7. The system of claim 1, wherein said system is configured to accumulate data samples in response to an accumulation clock that is shifted in phase relative to a sampling clock.

8. The system of claim 1, wherein said controller compensates for errors from pattern noise.

9. The system of claim 1, wherein said system further comprises a pulse source for pulsing ions to said ion detector.

10. A mass spectrometer system, comprising:

a) an ion source that produces ions; and b) a mass spectrometer for analyzing said ions, comprising:

i) an ion detector that produces an analog signal;

ii) an analog-to-digital converter configured to sample said analog signal to produce digital samples;

iii) a plurality of adders configured to sum corresponding digital samples to produce a summed sample indicating a mass spectrum, wherein said adders introduce errors; and iv) a controller configured to compensate for the errors introduced by the adders.

11. The mass spectrometer system of claim 10, wherein mass spectrometer is a time of flight mass spectrometer.

12. The mass spectrometer system of claim 10, wherein said ion source may be an electron impact, chemical ionization, atmospheric pressure ionization, glow discharge or plasma ion source.

13. The mass spectrometer system of claim 10, wherein said controller is configured to combine said summed sample with a value indicative of an expected error introduced by said adders.

14. The mass spectrometer system of claim 13, wherein said expected error is based on an actual error determined for a calibration signal tested by the system.

15. The mass spectrometer system of claim 13, wherein said expected error is based on actual errors determined for a plurality of different calibration signals tested by the system.

16. The mass spectrometer system of claim 10, wherein said controller is configured to ensure that said summed sample is produced using at least two different adders.

17. The mass spectrometer system of claim 10, wherein said corresponding digital samples are summed using different accumulation paths.

18. The mass spectrometer system of claim 10, wherein said system is configured to accumulate data samples in response to an accumulation clock that is shifted in phase relative to a sampling clock.

19. A method for generating mass spectra, comprising a) sampling a sequence of transients to produce a plurality of corresponding digital samples;

b) summing said corresponding digital samples using a plurality of different adders that introduce errors, wherein said summing produces summed digital sample and compensates for said errors.

20. The method of claim 19, wherein said summing includes combining said summed digital sample with a value indicative of an expected error introduced by said adders to compensate for said errors.

21. The method of claim 19, wherein said corresponding digital samples are summed using different accumulation paths.

* * * * *